United States Patent Office 3,334,597
Patented Aug. 8, 1967

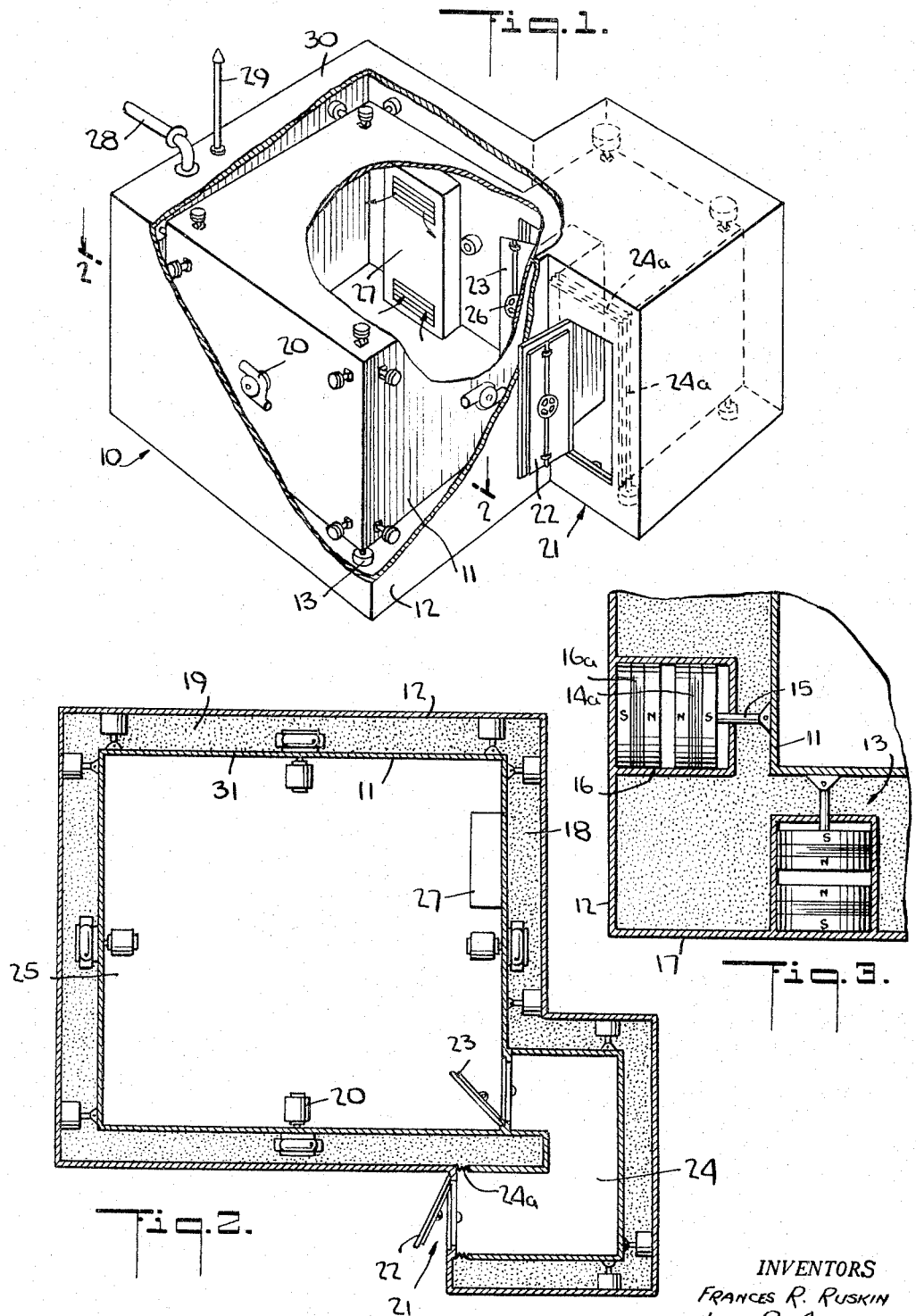

3,334,597
RADIATION-PROOF STRUCTURE
Frances R. Ruskin, 32 E. 67th St., New York, N.Y. 10021, and John Q. Adams, 8500 S. La Sierra Ave., Whittier, Calif. 90605
Continuation of application Ser. No. 22,575, Apr. 15, 1960. This application July 20, 1965, Ser. No. 477,081
5 Claims. (Cl. 109—1)

This invention relates to a structure offering protection for persons against harmful levels of nuclear radiation, and more particularly to such a shelter which provides protection against atomic radiation for extended periods of time. This application is a continuation of copending application Ser. No. 22,575, filed Apr. 15, 1960 (now abandoned), having the same title, and of application Ser. No. 759,920, filed Sept. 9, 1958 (now abandoned), having the same title.

With the advent of atomic warfare and peacetime nuclear experimentation a serious need has arisen for a shelter to which persons in danger areas can repair until the radiation level has been reduced to a safe figure. Not only is such protection needed in the immediate area of a nuclear explosion, but it is also required in adjacent and even remote regions which are exposed to the resultant fallout.

Although scientists are not entirely in agreement on the present extent of damage being caused by atomic fallout, there appears to be general agreement that continued contamination of the atmosphere by nuclear tests may eventually result in serious danger to human life. Thus the foreseeable future may require the incorporation of protective structures in the ordinary homes, apartment houses and the like in order to prevent exposure of the inhabitants to harmful daily doses of radiation even though actual atomic warfare may be averted.

In the event of an atomic war, however, the need for a radiation-proof shelter would be country-wide. Every family would need such a shelter regardless of geographical location. In view of the fact that atomic attacks would come practically instantaneously, without sufficient warning, and the harmful effects thereof would remain for possibly long periods of time, the preferred shelter should have sufficient space and living facilities and should be self-sustaining in most if not all respects. Furthermore, because of the universal demand for such protection the cost to the ultimate buyer should be economical and upkeep should be minimal.

It is therefore an object of the present invention to provide an atomic shelter which will protect human life from harmful nucleonic radiation for extended periods of time.

Another object is to provide such a shelter in which the interior living space is thermally insulated from the outer surface.

An additional object is to provide such a shelter having novel characteristics making its contained atmosphere conducive to easier breathing and the general well-being of its inhabitants.

Briefly, one structure embodying the principle of the present invention comprises an inner shell having properties rendering it non-destructive to negative ions in the contained atmosphere, and an outer shell surrounding the inner shell at a spaced position therefrom, thereby defining an interstitial fluid-tight cavity between the shells.

Thermally non-conductive means such as cylinder and plunger devices interconnect the shells at various places for resiliently maintaining the shells apart from one another in said spaced relation.

A radiation absorbent solution of barium permanganate, ferric permanganate, potassium permanganate, or sodium silicate fills the interstitial cavity and means such as pumps may be employed to circulate the solution.

A self-contained air supply means is included to generate and regenerate a proper life-sustaining atmosphere within the inner shell, and a baffle-type pressure sealing door means is provided to permit access to the interior of the shelter without destroying its radiation-protective character.

Other objects and features will become apparent in the following specification and claims, and in the drawings in which:

FIG. 1 is a partially sectioned perspective showing one embodiment of the invention;

FIG. 2 is a sectional plan view taken along lines 2—2 of FIG. 1; and

FIG. 3 is an enlarged partial section of one corner of FIG. 2.

Referring now to the drawings, FIG. 1 shows the shelter designated generally by the reference numeral 10. It has an inner shell 11 of convenient size and shape, and surrounding that is an outer shell 12 maintained at a spaced position therefrom by any suitable means such as the cylinder and plunger means 13 shown.

Such means is comprised, for example, of a piston 14 attached to the free end of a connecting rod 15 pivotally mounted at its other end to the inner shell 11, and such piston 14 is slidably disposed within cylinder 16 on the iner surface 17 of the outer shell 12 (see also FIGS. 2 and 3). This arrangement provides minimum contact between the two shells and provides effective thermal insulation between them. In order to maintain the shells in the desired spaced relationship, there is an electromagnet 16a within each cylinder 16, and an electromagnet 14a mounted on each piston 14. As shown in FIG. 3, the like poles of each pair of electromagnets 14a and 16a face each other, preventing contact between the opposing surfaces, due to the magnetic force of repulsion. The electromagnets 14a and 16a are electrically connected to a source of power (not shown) within the inner shell 11. Although it is contemplated that the piston rod 15 may be of stainless steel, aluminum, or the like, it may also be any suitable material combining the required structural strength with the necessary thermal insulation properties.

Other suitable spacing means such as permanent magnets, hollow conical supports, hangers, etc. (non shown) may be employed if desired, an additional requirement being that, if of metal, the metal should, in the presence of radiation, be stable, have a relatively long half-life, and emit a relatively low dosage of radiation per disintegration.

The spacing of the shells from one another defines an interstitial cavity 18 therebetween which surrounds the inner shell 11 on all of its surfaces. This cavity 18 is filled with a radiation absorptive solution 19 of a permanganate, i.e., ferric-, potassium-, or barium-, or a combination thereof, which absorbs the radiant waves coming through the system from outside the outer shell 12, and prevents a harmful radiation level being created within the inner shell 11. Another radiation absorptive solution 19 which may be employed, and which has the advantage of being transparent, is sodium silicate, e.g., sodium silicate E. The transverse thickness of the cavity 18 should be of the order of about one-half to two inches or more.

Although under normal circumstances natural convection within the fluid 19 will usually provide sufficient circulation, it may be desirable to install pumps of any conventional type such as the centrifugal pumps 20 shown to insure sufficient circulation to minimize heating of the fluid and reduce any undesirable tendencies of the fluid to increase the temperature inside the shelter.

The shelter is of air-tight design and has an entrance 21 of the air lock variety. An outer door 22 and an inner door 23 of the hatch type are provided and are connected by a baffled passageway 24 so that no portions of the interior 25 of the shelter will be unprotected by the surrounding fluid 19. Each door has suitable locking means 26 of conventional design for securing the doors in an effective manner.

In order to maintain the spaced resilient relationship between the inner shell 11 and the outer shell 12, there is a flexible connection 24a between the shells at the outer door 22. The flexible connection 24a must be impervious to the radiation absorptive solution 19 and may be composed of polyethylene, polypropylene or a like material which is flexible and impervious to the fluid 19.

A self-contained air generating and regenerating unit 27 of any well known kind is included to provide the required air when the shelter is closed up tight in use. Fluid 19 may be introduced from a supply (not shown) through connecting pipe 28, and a one-way vent pipe 29 is provided at the top 30 of the shelter to insure a full interstitial cavity 18 and to compensate for expansion and contraction of the solution 19 during temperature changes. Other equipment and features may be included as desired, e.g., toilet facilities, food, water, cooking and food storage facilities, and suitable furniture.

The shelter 10 may either be built above or on the ground, or may be partially or even entirely below ground, and either built as a separate unit or incorporated as part of a larger building structure. Various types of structures can be constructed according to the above, having any number of rooms as desired. For the sake of economy, however, a one-piece, box-like structure, or even an igloo or quonset hut type might be most practical. If 12.5 square feet per occupant is provided with a 6.5 foot height there will be room enough for emergency use for the two weeks believed necessary for survival in those radiation fall-out zones close to a nuclear explosion.

Aluminum is preferred for the construction material because of its lightness in weight, and because, in the presence of radiation, it is stable, has a long half-life, and emits a low dosage of radiation per disintegration. Aluminum sheets can be assembled by conventional welding, brazing or cold welding. A greater degree of heat control can be achieved by using a ceramic or oxidized coating on the inside surface 31 of the inner shell 11.

When glass is used for part of the structure it should preferably be of the lead type and may also be laminated with Plexiglas and even coated with Plexiglas or other suitable plastics to inhibit erosion of the glass by the permanganate solution. In addition such coatings, as well as the glass, capture neutrons and convert them into gamma rays. This process is known as the radiative capture $(n,\gamma)$ process. The gamma radiation is then absorbed by the circulating fluid between the shells. Those portions of the glass structure requiring no optical properties can be backed by aluminum sheet to reflect heat away from the permanganate solution and to reduce greatly the amount of heat absorbed thereby. Bright aluminum sheet is particularly useful as a heat reflector.

One particularly advantageous structure includes an inner shell 11 of the above described type which is made of glass or other material which is substantially non-destructive to the negative ions in the contained atmosphere within the shelter. Scientists have found that air with negatively charged ions permits easier breathing and contributes to the general well being. By avoiding the use of materials for the inner shell 11 which neutralize the negative ions in the air, i.e., metals, the proper balance of ions will be maintained. This feature is particularly desirable when confinement within the shelter will be necessitated for long periods of time, and where persons to be so confined suffer from asthma or similar infirmities.

Structures according to the present invention can be fabricated in any appropriate fashion. They can be completely constructed from the component parts at the site, or prefabricated in whole or in part at a central location or plant, and then transported to the site for final assembly and installation. If desired, especially where large expansive areas (e.g. factories and the like) are to be given optimum protection, fluid containing partitions can be used across the roof or ceiling alone, or also along some or all of the sides of the building as deemed necessary.

It is also conceivable that the partitions or "sandwiches" of this invention might be incorporated in or adapted for use on vehicular bodies for protection or armor on such vehicles needed for emergency transportation in radiation contaminated areas.

While particular radiation absorbent solutions have been indicated as preferable, it is possible that any suitable fluid, i.e., liquid or gas, might be used having the desired radiation absorption characteristics. A sufficient quantity of such absorbent fluid is used to reduce the nuclear radiation within the shelter, or on the side of the absorptive partition opposite the source of radiation, to a safe level for life, human, animal, vegetable or the like as desired.

While one embodiment of the present invention has been shown and described, it is to be understood that certain changes and additions can be made by those skilled in the art without departing from the scope and spirit of this invention.

What is claimed is:

1. A shelter for protection again nucleonic radiation comprising an inner shell adapted for accommodating one or more persons, an outer shell completely enveloping said inner shell in all directions and at a spaced position therefrom and defining an interstitial fluid-tight substantially continuous cavity therebetween, means interconnecting said shells for maintaining them in such spaced relation, a fluid in said cavity abosrbent to nuclear rays, pump means for circulating said fluid in said cavity, air supply means for maintaining a proper atmosphere within said shelter and means for permitting access to the interior of said shelter without destroying its radiation protective character.

2. A shelter for protection against nucleonic radiation comprising an inner shell adapted for accommodating one or more persons, an outer shell completely enveloping said inner shell in all directions and at a spaced position therefrom and defining an interstital fluid-tight substantially continuous cavity therebetween, means interconnecting said shells for maintaining them in such spaced relation, a radiation absorbent permanganate solution in said cavity, pump means for circulating said solution in said cavity, air supply means for maintaining a proper atmosphere within said shelter and means for permitting access to the interior of said shelter without destroying its radiation proof character.

3. A shelter for protection against nucleonic radiation comprising an inner shell being nondestructive to negative ions adapted for accommodating one or more persons, an outer shell completely enveloping said inner shell in all directions and at a spaced position therefrom and defining an interstitial fluid-tight substantially continuous cavity therebetween, thermally insulating means interconnecting said shells for maintaining them in such spaced relation, a radiation absorbent solution in said cavity containing a compound selected from the group consisting of potassium permanganate, ferric permanganate, barium permanganate and soduim silicate, pump means for circulating said solution in said cavity, air supply means for maintaining a proper atmosphere within said shelter and means for permitting access to the interior of said shelter without destroying its radiation protective character.

4. A shelter for protection against nucleonic radiation comprising an inner glass shell adapted for accommodating one or more persons, an outer metal shell completely enveloping said inner shell in all directions and at a spaced position therefrom and defining an interstitial fluid-tight substantially continuous cavity therebetween, thermally insulating means interconnecting said shells for maintaining them in such spaced relation, a radiation absorbent solution in said cavity containing a compound selected from the group consisting of potassium permanganate, ferric permanganate, barium permanganate and sodium silicate, pump means for circulating said solution in said cavity, air supply means for maintaining a proper atmosphere within said shelter and means for permitting access to the interior of said shelter without destroying its radiation protective character.

5. A shelter for protection against nucleonic radiation comprising an inner glass shell adapted for accommodating one or more persons, an outer metal shell completely enveloping said inner shell in all directions and at a spaced position therefrom and defining an interstitial fluid-tight substantially continuous cavity therebetween, thermally insulating plunger means interconnecting said shells for resiliently maintaining them in such spaced relation, a radiation absorbent solution in said cavity containing a compound selected from the group consisting of potassium permanganate, ferric permanganate, barium permanganate and sodium silicate, pump means for circulating said solution in said cavity, air supply means for maintaining a proper atmosphere within said shelter and means for permitting access to the interior of said shelter without destroying its radiation protective character.

References Cited

UNITED STATES PATENTS

| 1,822,154 | 9/1931 | Kramer et al. | |
| 2,822,765 | 2/1958 | Rudinger | 109—1 |
| 2,873,243 | 2/1959 | Wigner et al. | |

FOREIGN PATENTS

| 536,540 | 5/1941 | Great Britain. |

OTHER REFERENCES

Glasstone, Principles of Nuclear Reactor Engineering, D. Van Nostrand Company, Inc. 1955 TK9202 G55, p. 581.

REINALDO P. MACHADO, *Primary Examiner.*

HARRISON R. MOSELEY, *Examiner.*

L. J. SANTISI, *Assistant Examiner.*